United States Patent Office 3,293,341
Patented Dec. 20, 1966

3,293,341
HEAT TREATMENT OF HOLLOW-SHAPED STRUCTURES
Paul J. Boeke and Robert J. Martinovich, Bartlesville, Okla., assignors to Phillips Petroleum Company, a corporation of Delaware
No Drawing. Filed Nov. 12, 1963, Ser. No. 323,118
7 Claims. (Cl. 264—94)

This invention relates to a process for the heat treatment of hollow-shaped structures. In one aspect the invention relates to a method for increasing the stiffness of hollow-shaped structures of polymers of mono-1-olefins. In another aspect the invention relates to a method for preparing a blown bottle having improved stiffness.

It is known in the art to extrude plastic materials into a mold cavity so as to form a bottle or other type of container. One method of doing this is to advance the plastic material to form a hollow cylindrical stream, which stream is first caused to move confluently or to unite at a focus or point to form a tube closed at a point adjacent to the lower end of a receiving element or mold and preferably near the bottom end of the mold cavity. By this means a predetermined mass of a plastic may be delivered upon the lower interface of the mold used. Following this action the hollow cylindrical stream or body is extruded at a rate which may vary depending upon the wall thickness desired for different parts of the article being formed. In the employment of thermoplastic materials the material is extruded at a temperature above the melting point of the thermoplastic. After completion of the formation of the bottle or other type of container, the bottle is ejected from the apparatus for the formation thereof and permitted to cool.

A continual effort is being exerted by the bottle blowing industry to reduce production cost of blow molded containers. One method to reduce costs is by maintaining the weight of a unit as low as possible and still retain sufficient stiffness for the desired application. This is particularly important for a process wherein the cost of the materials may be as much as 50 percent of the total cost of the final product. One method by which this can be achieved is by increasing the density of the resin. Unfortunately, an increase in base resin density results in a sacrifice of stress-cracking performance below the limits to which it is tolerable.

It is an object of the invention to provide a method for the formation of hollow structures.

Another object is to provide a blown bottle having improved stiffness.

Yet another object of the invention is to provide a method for increasing the stiffness of hollow-shaped structures of polymers of mono-1-olefins.

Still another object of the invention is to provide a method for preparing a blown bottle from a polymer of a mono-1-olefin.

These and other objects of the invention will be readily apparent to those skilled in the art from the accompanying disclosure and appended claims.

These objects are broadly accomplished by treating the hollow-shaped structure at a temperature of 1 to 50° F. below the crystalline freeze point of the polymer of the mono-1-olefin for a period of time sufficient to increase the structure's resistance to deformation upon cooling the structure to ambient temperature.

The invention is broadly applicable to a plastic material which is capable of being blow molded to a hollow-shaped article. Preferably the material is a crystalline material and more preferably a thermoplastic polymer of a mono-1-olefin prepared from a monomer having 2 to 8 carbon atoms per molecule, for example, polyethylene, polypropylene, copolymers of ethylene and propylene, ethylene and butene-1, and the like.

The invention is particularly applicable to the high density polymers of mono-1-olefins. The term "polymers" as employed herein includes both homopolymers and copolymers of the monoolefins. Particularly preferred are the polymers of ethylene prepared by the method of Hogan et al., U.S. 2,825,721, issued March 4, 1958. Preferably, these polyethylenes have a density of 0.940 to 0.970 gm./cc. while the copolymers of ethylene and, for example, butene-1 have a density in the range of 0.935 to 0.960 gm./cc. However, these recitations of density are not limitative on the invention.

It is generally conceded that the crystalline freeze points of high density polyethylene, copolymers of ethylene and butene, and polypropylene are about 252° F.

It has now been found that when a hollow-shaped article, such as a blown bottle, is annealed or heat treated at a temperature in the range of 1 to 50° F. below its crystalline freeze point for a period of time of at least 1 minute, preferably 1–10 minutes, more preferably 3–10 minutes, that upon subsequent cooling to room temperature the bottle has significantly increased in stiffness. Therefore, less material can be employed for an annealed container to obtain or approximate the stiffness of an unannealed container. For example, for a hollow bottle prepared from a copolymer of ethylene and butene having a melt index of 0.3, it has been found that upon annealing or heat treating at 245° F. for approximately 10 minutes that the stiffness is such that approximately 8 percent less material may be employed in the container to obtain the same degree of stiffness as for an unannealed container containing the extra material. For a high density polyethylene having a density of 0.960 gm./cc. and a melt index of 0.9, it had been found that a reduction in bottle weight of 15 percent may be obtained by annealing while still maintaining the same stiffness characteristics. Thus, more bottles can be prepared from the same amount of material if the annealing step is employed.

As defined herein stiffness is determined on an Instron Tensile testing machine with a compression cell C. An aluminum disc 6 inches in diameter is attached to the bottom of the crosshead in line with the cell. A one-half shaft prepared by cutting a 1½ inch diameter rod in half lengthwise is attached to the disc on the crosshead and another to the cell and lined up in the same vertical plane. The two half shafts used are 6 inches in length. The bottle is then positioned to test on the cell perpendicular to the half shaft. The bottle is held by hand and the crosshead is lowered until the upper half shaft is touching the bottle but not exerting any pressure. The recording chart is started and the crosshead is moved at a speed of 2 inches per minute to compress the bottle 1 inch. Stiffness is taken as the pounds force exerted on the cell at a ½-inch deflection of the bottle.

Density is determined herein by ASTM D–1505–60T. Melt index is determined herein by ASTM D–1238–52T.

Crystalline freeze points are determined by melting a sample of the polymer, inserting a thermocouple into the molten polymer and allowing the molten polymer to cool slowly. The temperature is recorded and plotted versus time. The crystalline freeze point is the first plateau in the time versus temperature curve.

Any suitable method for blow molding the polymer is suitable herein and the art is fully cognizant of such methods. The plastic material introduced into the mold may be compounded with other synthetic resins, plasticizers, antioxidants and the like. Ribbons, beads, and other expedients for further strengthening the flexible or rigid plastic wall structure are also readily employable.

The invention is best illustrated by the following example.

EXAMPLE

Bottles were blow molded from a copolymer of ethylene and butene-1 having a density of 0.950 gm./cc. and a melt index of 0.3 and also from a homopolymer of polyethylene having a density of 0.960 and a melt index of 0.9. Both of these polymers were prepared in the presence of chromium oxide catalyst such as disclosed in U.S. 2,825,721. Upon cooling to ambient temperatures the bottles were then placed in an oven and the temperature maintained at 245° F. for variable lengths of time. Bottle densities and stiffness were determined both before and after the heat treatment. It is readily apparent from the following data that a substantial increase in stiffness for the bottles was obtained for both the copolymers and homopolymers as compared to the unannealed bottles.

Table I

|  | Copolymer of Ethylene and Butene | Homopolymer of Polyethylene |
| --- | --- | --- |
| Bottle Density: |  |  |
| Unannealed | 0.942 | 0.952 |
| Annealed (Autoclave) | 0.950 | 0.963 |
| Bottle Stiffness, Lbs.: |  |  |
| Unannealed— |  |  |
| Bottle Wt., 23 gms | 4.8 | 5.8 |
| Bottle Wt., 20 gms |  | 4.2 |
| Bottle Wt., 17 gms | 1.9 | 2.4 |
| Annealed (Oven)— |  |  |
| Bottle Wt., 23 gms | 6.5 | 7.7 |
| Bottle Wt., 20 gms | 3.8 | 5.5 |
| Bottle Wt., 17 gms | 2.7 | 3.5 |
| Oven time,[1] 1 min |  | 6.9 |
| Oven time,[1] 3 min |  | 8.0 |
| Oven Time,[1] 10 min |  | 8.2 |
| Oven Time,[1] 15 min |  | 8.3 |
| Autoclave Time,[2] 30 min |  | 8.8 |

[1] 245° F., 23 gm. bottle.
[2] 250° F., 23 gm. bottle, steam atmosphere.

While certain examples, structures, composition and process steps have been described for purposes of illustration, the invention is not limited to these. Variations and modifications within the scope of the disclosure and claims can readily be effected by those skilled in the art.

We claim:

1. A method for preparing a hollow structure having improved stiffness comprising molding a polymer of a mono-1-olefin by use of a fluid pressure differential to form a hollow structure, cooling such structure to below its crystalline freeze point, heat treating said structure at a temperature of 1 to 50° F. below its crystalline freeze point for a period of time sufficient to increase the structure's resistance to deformation, and thereafter cooling said structure.

2. The method of claim 1 wherein said time is 1 to 10 minutes.

3. A method for increasing the stiffness of a blown bottle prepared from a copolymer of ethylene and butene-1 having a density of 0.935 to 0.960 gm./cc. comprising heat treating said bottle at a temperature of 230 to 251° F. for 3 to 10 minutes and thereafter cooling said bottle.

4. A method for preparing a hollow structure having improved stiffness comprising blow molding a polymer of a mono-1-olefin to form a hollow structure, cooling said structure to below its crystalline freeze point, heat treating said structure at a temperature of 1 to 50° F. below its crystalline freeze point for 1 to 10 minutes and thereafter cooling said structure to ambient temperature.

5. A method for preparing a blown bottle having improved stiffness comprising blow molding a polymer of ethylene having a density of 0.940 to 0.970 gm./cc. to form a bottle at a temperature above its crystalline freeze point, cooling said bottle to below its crystalline freeze point, heat treating said bottle at a temperature of 1 to 50° F. below its crystalline freeze point for 1 to 10 minutes and thereafter cooling said bottle to ambient temperature.

6. A method for preparing a blown bottle having improved stiffness comprising blow molding a copolymer of ethylene and butene-1 having a density of 0.935 to 0.960 gm./cc. to form a bottle at a temperature above 252° F., cooling said bottle below 252° F. heat treating said bottle at 230 to 251° F. for 3 to 10 minutes and thereafter cooling said bottle to ambient temperature.

7. A method for preparing a blown bottle having improved stiffness comprising blow molding polyethylene having a density of 0.940 to 0.970 gm./cc. to form a bottle at a temperature above 252° F., cooling said bottle below 252° F., heat treating said bottle at 230 to 251° F. for 3 to 10 minutes and thereafter cooling said bottle to ambient temperature.

References Cited by the Examiner

UNITED STATES PATENTS 2,855,517  10/1958  Rainer et al.
2,904,480  9/1959   Rainer et al.
3,152,380  11/1964  Martin.

ROBERT F. WHITE, *Primary Examiner.*

A. R. NOE, *Assistant Examiner.*